(12) United States Patent
Courtney et al.

(10) Patent No.: US 6,351,758 B1
(45) Date of Patent: Feb. 26, 2002

(54) BIT AND DIGIT REVERSAL METHODS

(75) Inventors: Chad Courtney; Natarajan Seshan, both of Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/244,587

(22) Filed: Feb. 4, 1999

Related U.S. Application Data

(60) Provisional application No. 60/074,734, filed on Feb. 13, 1998.

(51) Int. Cl.[7] ................................................. G06F 15/00
(52) U.S. Cl. ......................................................... 708/404
(58) Field of Search ................................. 708/403–404

(56) References Cited

U.S. PATENT DOCUMENTS

| | | | | |
|---|---|---|---|---|
| 4,181,976 A | * | 1/1980 | Collins et al. | 708/404 |
| H570 H | * | 1/1989 | Tylaska et al. | 708/403 |
| 4,916,649 A | * | 4/1990 | Yorozu et al. | 708/404 |
| 5,012,441 A | * | 4/1991 | Retter | 708/404 |
| 6,058,409 A | * | 5/2000 | Kozaki et al. | 708/404 |
| 6,115,728 A | * | 9/2000 | Nakai et al. | 708/404 |

OTHER PUBLICATIONS

"First Principles of Discrete Systems and Digital Signal Processing", Donald E. Kirk, Addison–Wesley Publishing Company, 1988, pp. 512–516.

* cited by examiner

Primary Examiner—Tan V. Mai
(74) Attorney, Agent, or Firm—J. Dennis Moore; W. James Brady, III; Frederick J. Telecky, Jr.

(57) ABSTRACT

The present invention provide a method of implementing bit reversal using a subtree lookup table. In another aspect of the invention, a subtree lookup table is used to implement digit reversal.

4 Claims, 5 Drawing Sheets

| n3n2<br>m1m0<br>↓ | n1n0<br>m3m2<br>↓ | NORMAL<br>ORDER<br>x(n3 n2 n1 m0) | DIGIT-REVERSED<br>ORDER (2-DIGIT)<br>X(m1 m0 m3 m2) |
|---|---|---|---|
| 00 | 00 | x(0 0 0 0) | X(0 0 0 0) |
|    | 01 | x(0 0 0 1) | X(0 1 0 0) |
|    | 10 | x(0 0 1 0) | X(1 0 0 0) |
|    | 11 | x(0 0 1 1) | X(1 1 0 0) |
| 01 | 00 | x(0 1 0 0) | X(0 0 0 1) |
|    | 01 | x(0 1 0 1) | X(0 1 0 1) |
|    | 10 | x(0 1 1 0) | X(1 0 0 1) |
|    | 11 | x(0 1 1 1) | X(1 1 0 1) |
| 10 | 00 | x(1 0 0 0) | X(0 0 1 0) |
|    | 01 | x(1 0 0 1) | X(0 1 1 0) |
|    | 10 | x(1 0 1 0) | X(1 0 1 0) |
|    | 11 | x(1 0 1 1) | X(1 1 1 0) |
| 11 | 00 | x(1 1 0 0) | X(0 0 1 1) |
|    | 01 | x(1 1 0 1) | X(0 1 1 1) |
|    | 10 | x(1 1 1 0) | X(1 0 1 1) |
|    | 11 | x(1 1 1 1) | X(1 1 1 1) |

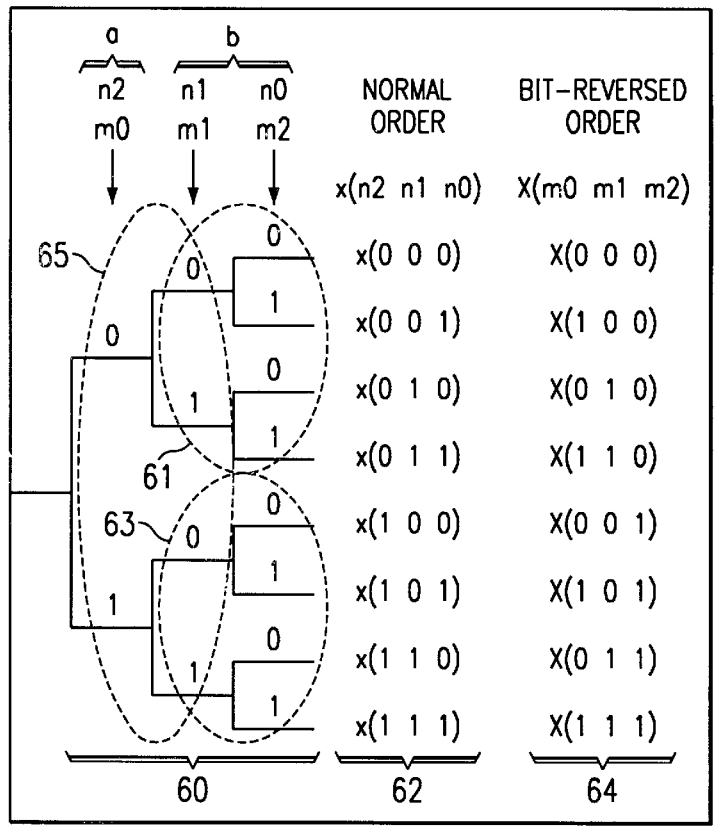
FIG. 6
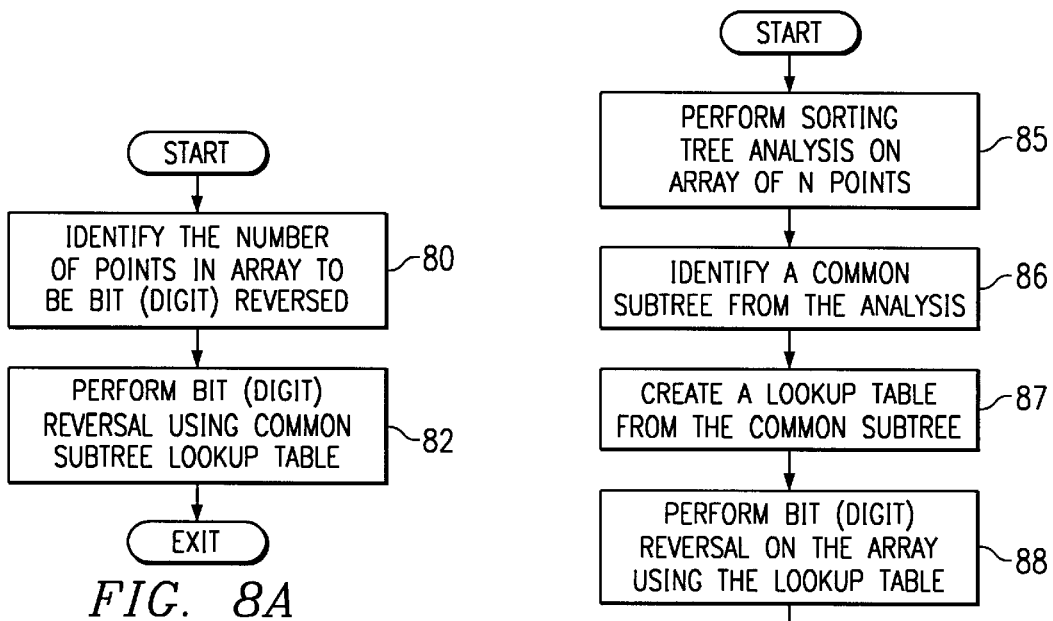
FIG. 8A
FIG. 8B

BIT AND DIGIT REVERSAL METHODS

This amendment claims priority under 35 USC § 119(e)(1) of provisional application No. 60/074,734, filed Feb. 13, 1998.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

This invention relates generally to methods for recordering data and more particularly to bit and digit reversal methods.

BACKGROUND OF THE INVENTION

Bit-reverse and digit-reverse routines are routines in which data is reordered based upon its index value from 0 to N-1, where N is the number of points to be bit/digit-reversed.

Discrete transforms are the main users of methods for bit-reverse and digit-reverse. Discrete transforms take discrete inputs in one domain and convert them to discrete inputs of another. For example, a fast fourier transform (FFT) takes a discrete time domain input and transforms it into the discrete frequency domain output (i.e. $x(t) \rightarrow X(j\omega)$). Many discrete transforms such as the FFT, discrete cosine transform (DCT), inverse DCT (IDCT), and discrete sine transform (DST), etc. are executed in-place, i.e., use the same memory locations for both the input and output. This is usually done to reduce both data size and complexity. To take full advantage of in-place methods there remains a need for bit/digit-reversing methods.

For example, if the in-place method uses decimation-in-frequency (DIF) decomposition (see for reference Robert D. Strum and Donald E. Kirk, *First Principles of Discrete Systems and Digital Signal Processing*, Addison-Wesley Publishing Company, 1989, pp. 512–516, hereinafter referred to as "Strum and Kirk") the input would be normal order but the output would be in bit/digit-reverse order as depicted in FIG. 1. In order to view the resulting output in normal order the results need to be bit-reversed. Also note that if the in-place discrete transform uses a decimation-in-time (DIT) (see for reference Strum and Kirk, pp. 495–512) decomposition, the inputs require bit/digit-reversing while the outputs are in normal order.

TABLE 1.1

Memory Location vs. Output, in Hex Format

| Memory Location | Bit Reverse Order Output |
|---|---|
| mem[0] | X[0] |
| mem[1] | X[4] |
| mem[2] | X[2] |
| mem[3] | X[6] |
| mem[4] | X[1] |
| mem[5] | X[5] |
| mem[6] | X[3] |
| mem[7] | X[7] |

TABLE 1.2

Memory Location vs. Output, in Bit Format

| Memory Location | Bit Reverse Order Output |
|---|---|
| mem[000] | X[000] |
| mem[001] | X[100] |
| mem[010] | X[010] |
| mem[011] | X[110] |
| mem[100] | X[001] |
| mem[101] | X[101] |
| mem[110] | X[011] |
| mem[111] | X[111] |

There is a direct correlation between the normal order and bit-reversed order which can be shown using the example of an in-place discrete transform as shown in FIG. 1. The in-place discrete transforms' input is a normal order 8-point array, x[N] and the output is a bit-reversed ordered 8-point array, X[N]. The order of storage of the input array x[N] is in normal order so that the array elements x[0]–x[7] line up with their respective memory locations 0–7 as indicated in FIG. 1. The order of storage of the elements in the output array X[N] is in bit-reversed order when compared to their respective memory locations. This is illustrated better in Tables 1.1 and 1.2, shown hereinabove, where the memory locations and the bit-reversed order output are displayed in hex format and bit format, respectively. It can be seen in Table 1.2 that the bit notation of the memory locations and the bit notation of the bit-reversed ordered output are swapped. This is seen even better, as illustrated by the exemplary tree diagram shown in FIG. 2, when viewing the resulting normal order sorting, shown at 22, and bit-reverse order sorting, shown at 24, of a tree 20.

Normal order sorting, as depicted at 22 in the exemplary tree diagram of FIG. 2, is sorted by looking at the most significant bit, n2 in this example, and if the most significant bit is a zero then it is placed in the upper half of the tree 20. If the most significant bit is a one then it is placed in the lower half of the tree 20. Then the top half and bottom half subtrees are sorted using the same criteria on the second most significant bit, n1 in this example. This process is repeated until the array is completely sorted.

Bit-reversed order sorting, as illustrated at 24 in the exemplary tree diagram of FIG. 2, is sorted by looking at the least significant bit, m0, and if the least significant bit is zero then it is placed in the upper half of the tree 20. If the least significant bit is a one then it is placed in the lower half of the tree 20. Then the top half and bottom half subtrees are sorted using the same criteria on the second least significant bit, m1. This process is repeated until the array is completely sorted. From this one can see that to go from bit-reversed order to normal order or visa-versa one simply needs to "reverse the bits" of the desired value to produce the appropriate offset from a base memory location (i.e. for desired value X[n2 n1 n0] of a bit reversed array use offset of [n0 n1 n2] from the beginning of the array.) Since the base memory location is zero in this example, the offset is the memory location.

To perform the bit/digit-reversal of an array of data in-place requires the swapping of the values whose indices are the bit/digit-reversal of one another. When traversing an array during a bit/digit-reversal routine the values are not swapped twice (i.e. if memory location [001] is swapped with [100] then do not swap [100] with [001]) otherwise they are placed back in their original order. One way to avoid this is to set i to the bit-reverse of j and then only swap [i] with [j] if i<j; this ensures that a double swapping error does not occur.

Digit-reversal is similar to bit-reversal; actually, bit-reversal is the single digit case of digit-reversal. Digit reversal reverses digits instead of bits. For example, a radix-4 FFT produces an output whose results are in 2-digit digit-reverse order. To perform the needed 2-digit digit-reverse ordering, the two least significant bits are swapped with the two most significant bits, then the second pair of least significant bits are swapped with the second pair of most significant bits, and so on. An exemplary tree diagram of 2-digit digit-reverse order sorting is depicted in FIG. 3 for a 16-point 2-digit digit-reversed order output.

It would seem easy to generate a quick routine to perform an in-place bit or digit-reverse routine. All one has to do is swap some bits or digits to produce a bit/digit-reversed order to be used as offsets from a base address and make sure that nothing is double swapped. This method produces satisfactory results for a small number of points, but to perform a bit-reverse on 16K (16×1024) points, for example, which is ($2^{14}$), a total of 14 bits need to be manipulated, thus requiring that 7 bit pairs be swapped. Furthermore, this routine would require a central processing unit ("CPU") cycle count on the order of $Nlog_2N$ cycles to complete, which is relatively slow.

Thus, what is needed is an fast, simple method to perform in-place bit and digit reversal.

SUMMARY OF THE INVENTION

The present invention is a method of performing bit reversal which comprising the steps of identifying number of points in an array to be bit-reversed and performing bit reversal using a common subtree lookup table accordingly.

In another aspect of the present invention, a method of performing digit reversal is provided which includes the steps of identifying the number of points in an array to be digit-reversed and perform digit reversal using a common subtree lookup table accordingly.

In yet another aspect of the present invention, a method of performing bit reversal on an array of N points is provided which includes the steps of performing sorting tree analysis on the array, identifying a common subtree from the analysis, creating a lookup table from the common subtree, and performing bit reversal on the array using the lookup table generated from the common subtree.

In still another aspect of the present invention, a method of performing digit reversal on an array of N points is provided which includes the steps of performing sorting tree analysis on the array, identifying a common subtree from the analysis, creating a lookup table from the common subtree, and performing digit reversal on the array using the lookup table generated from the common subtree.

These and other features of the invention that will be apparent to those skilled in the art from the following detailed description of the invention, taken together with the accompanying drawings.

DESCRIPTION OF THE DRAWINGS

FIG. 6 depicts an order sorting tree for normal and bit-reversed order (3-bit) with a small lookup table in accordance with the present invention;

FIGS. 8A and 8B show flow diagrams illustrating general operation of bit and digit reversal in accordance with the present invention.

DETAILED DESCRIPTION OF THE INVENTION

Figures 3, 4:
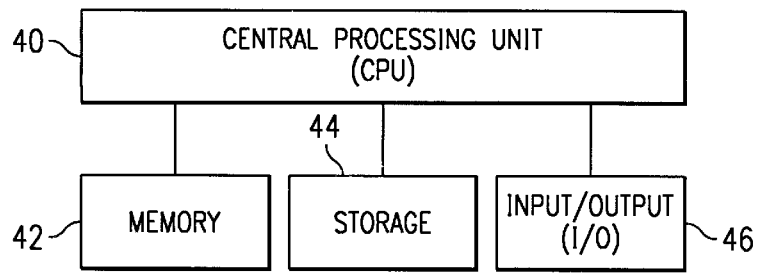
FIG. 3 shows an order sorting tree for normal and digit-reversed order (2-digit)
FIG. 4 is a block diagram illustrating an exemplary data processing device for implementing the present invention.

FIG. 4 illustrates an exemplary data processing system operable to implement the present invention. The exemplary data processing system shown in FIG. 4 includes central processing unit (CPU) 40, memory 42, storage 44, and input/output (I/O) 46 devices. Other data processing system which are operable to implement the present invention will be readily apparent to one skilled in the art.

In implementing the present invention, a lookup table can be used where all of the bit-reverse order values are in a table ready to be used for swapping. This produces a CPU cycle count on the order of N cycles to complete (assuming the lookup table already existed) but also requires an additional 16K halfwords of data space to store the lookup table which can be significant. Instead, the present invention uses a small look up table, having a size on the order of about square root of N but no more that x multiplied by the square root of N (where x is the radix value, i.e., 2 for bit-reverse, 4 for 2-digit digit-reverse, etc.). For the 16K example, the lookup table in accordance with the present invention includes 128 values and the method still only requires a cycle count on the order of N CPU cycles. Furthermore, since the lookup table as implemented in accordance with the present invention only requires the values 0–127, it fits in 128 Bytes instead of 16K halfwords. In other words, the reduced lookup table in accordance with the present invention is 1/256 the size of the old lookup table. Using the small lookup table in accordance with the present invention, both bit-reverse and digit-reverse techniques are discussed in more detail hereinbelow.

Figure 1:
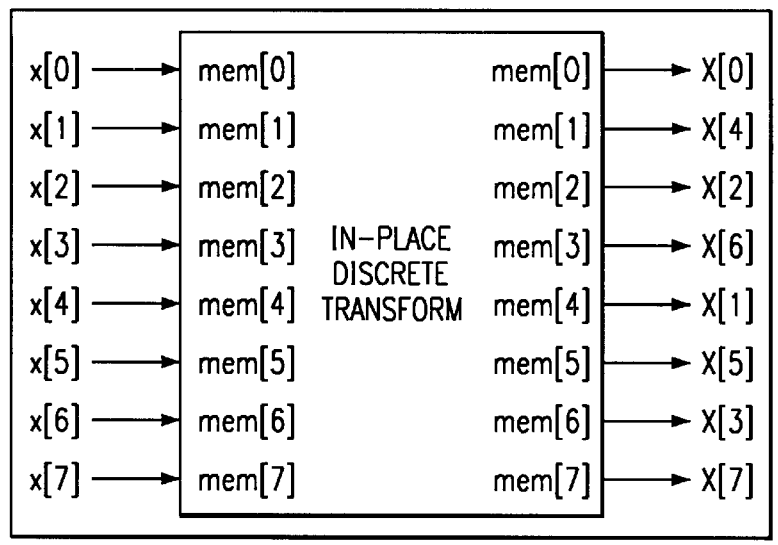
FIG. 1 depicts how an in-place discrete transform decimation-in-frequency transforms sequential inputs to a non-sequential output.
Figure 2:
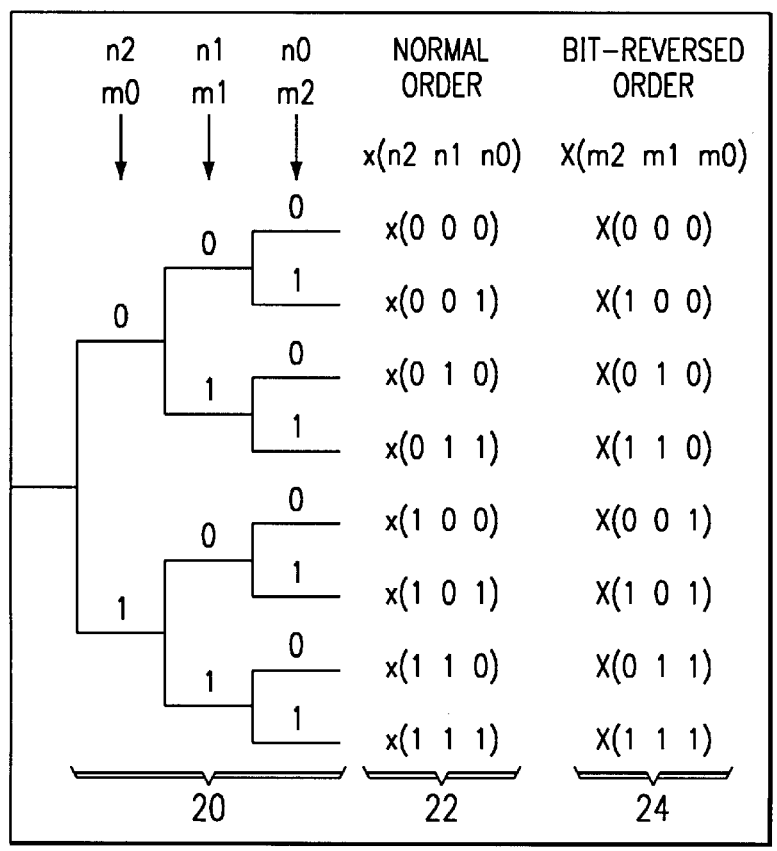
FIG. 2 illustrates an order sorting tree for normal and bit-reversed order (3-bit)
Figure 5:
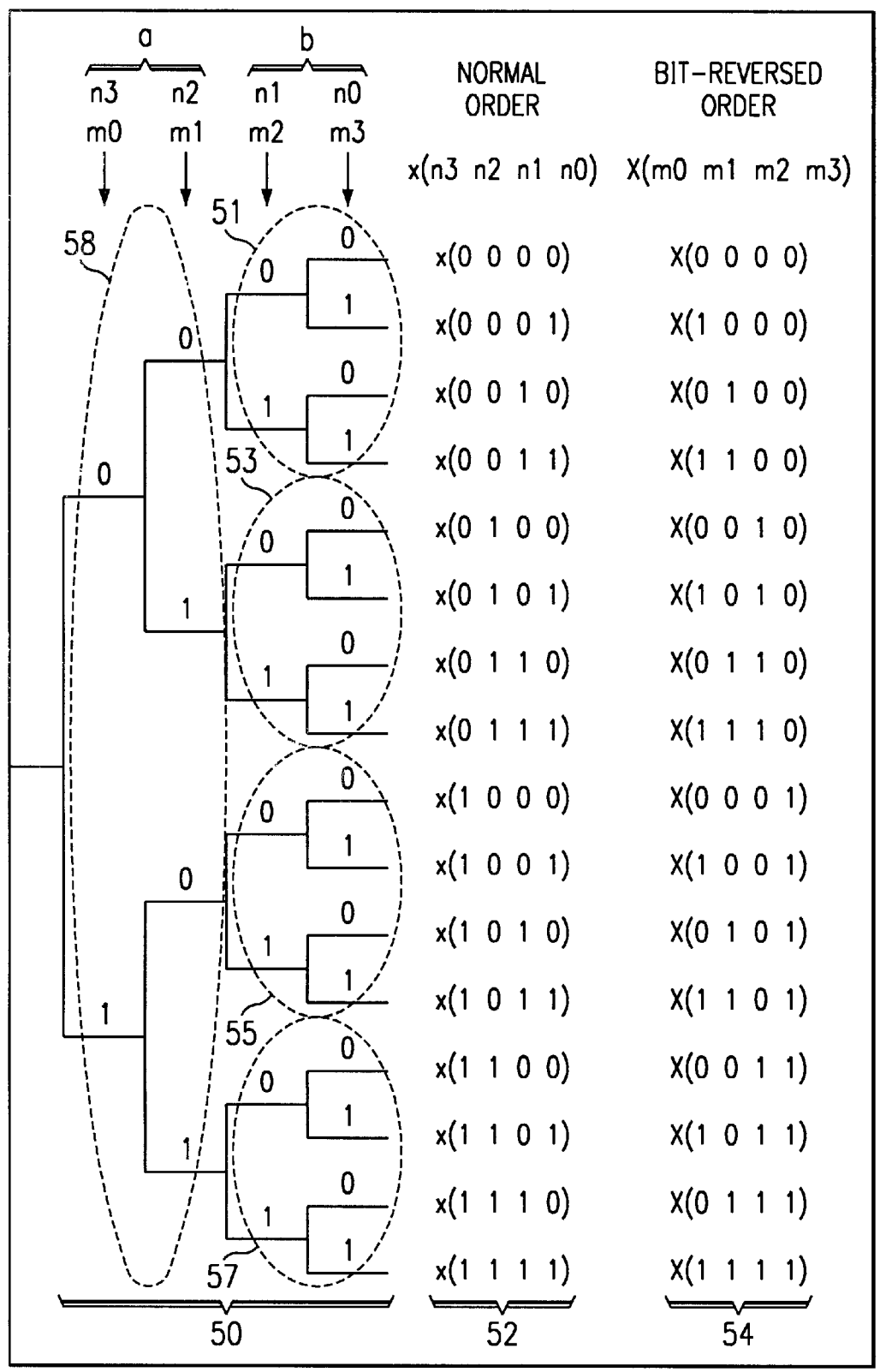
FIG. 5 illustrates an order sorting tree for normal and bit-reversed order (4-bit) with a small lookup table in accordance with the present invention.

In one embodiment of the method of the present invention a tree used in the bit-reversed order sorting, such as the one shown in FIG. 2, is divided into smaller identical trees. The bit-reverse order sorted values from certain of the resulting smaller trees are then used as the lookup table. This is shown in FIG. 5, which depicts a tree diagram that shows normal, at 52, and bit-reverse, at 54, order sorting using order sorting tree 50. The circles in FIG. 5 show how the tree 50 is divided into equal subtrees (51, 53, 55, and 57) which include half of the number of bits (levels) of the whole tree. Since these subtrees (51, 53, 55, and 57) are identical, a bit-reversed index of one of the subtrees is all that is needed. Then, by combining the bit-reversed order index values of the upper half of the bits (the a bits) and those of the lower half of the bits (the b bits) a bit-reversed routine for an array of N points, where N=$2^{(\# \ of \ a \ bits + \# \ of \ b \ bits)}$, is achieved in linear time producing a CPU cycle count on order of N cycles and using a relatively small lookup table. Note that the upper half bits create a parent tree 58 which is identical to the subtrees (51, 53, 55 and 57) and uses the same bit-reversed index as subtrees (51, 53, 55 and 57).

An exemplary C language program used to perform the in-place bit-reversal of an array in accordance with the first embodiment of the present invention is shown as Program 1 in Appendix 1. In this routine the a bits are the upper half bits of the tree 50 shown in FIG. 5. Thus, it is the outer loop of the program. The bit-reversed index values based on the a bits are the lower bits of the offset pointer j while the offset pointer i goes through normal order (0 through N−1). Note that the portion of j produced by and the bit-reversed index values based on the b bits is shifted right by a value nbot, where nbot is the number of bits the bottom index produces. Thus, by combining the index[a] and the index[b] the appropriate index[i] is generated with a table of size square root of N instead of N while the speed of a lookup table is still obtained. An exemplary C language program for producing a digit-reversed index of any radix (for bit-reverse radix-2 is used) is shown as Program 3 in Appendix 3.

This works great for a 16-point in-place bit-reversal since there is an even number of bits in the input. A little more work is necessary to accommodate an input with an odd number of bits such as 8-points which has 3 bits (in that $8=2^3$). A tree 60 for an 8-point bit-reverse order sort is shown in FIG. 6. Here the identical subtrees (61 and 63) cross over between levels (i.e. sharing the n1 bit with the identical "parent" tree 65). This is accommodated using a variable "astep" which is set to only traverse the a bits on the outer loop. In the case of bit-reverse, the variable astep is set to 1 when the number of bits, as indicated by the variable nbits, is even and is set to 2 when the variable nbits is odd. By setting the variable astep to 2 only the upper half of the tree is used where n1 of tree 65 is zero, the a half, while the lower half of the tree, the b half, is used for the general case of n1. This allows us to use the same identical subtree for sorting. This is shown in FIG. 6 and in the exemplary C language program, Program 3, in Appendix 3.

Figure 7:
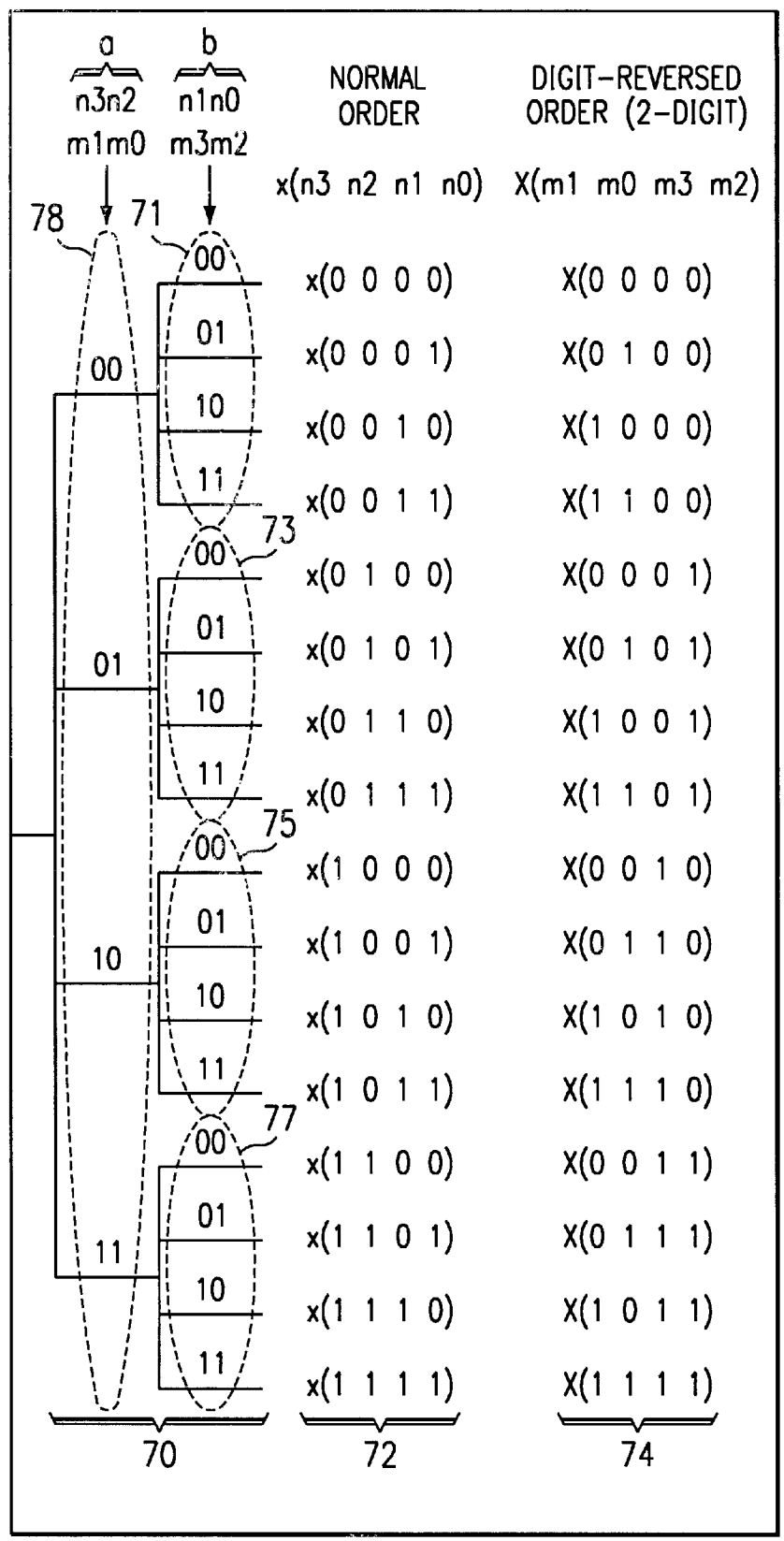
FIG. 7 illustrates an order sorting tree for normal and digit-reversed order (2-digit) with small lookup table in accordance with the present invention.

In another embodiment of the present invention, a digit-reverse routine, which is simply an extension of the bit-reverse routine, is implemented where the digit is a set of bits which require swapping. The tree used in the digit-reverse order sorting is similar to the one shown in FIG. 3 and is divided into smaller identical trees. Then the digit-reverse order sorted values from the resulting smaller table are used as the lookup table. This is illustrated in the tree diagram shown in FIG. 7 for a radix-4 (2-digit) tree 70. The tree diagram also shows normal, at 72, and digit-reverse, at 74, order sorting. The circles in FIG. 7 show how the tree 70 is divided into equal subtrees (71, 73, 75, and 77) which include half of the number of digits (levels) of the whole tree 70. Since these subtrees (71, 73, 75, and 77) are identical, a digit-reversed index is created for only one of the subtrees (71, 73, 75, and 77). By combining the digit-reversed order index values of the upper half of the digits (the a digits) and the lower half of the digits (the b digits), a digit-reversed routine for the array of N points is achieved in linear time producing a cycle count of order N cycles and using a relatively small lookup table. Note that the upper half digits create a parent tree 78 which is identical to the subtrees and uses the same digit-reversed index as (71, 73, 75, and 77).

An exemplary C language program used to perform the in-place digit-reversal of an array is shown is Program 2 of Appendix 2 hereinbelow. In this routine the a digits are the upper half bits of the tree 70 shown in FIG. 7 thus it is the outer loop of the program and the digit-reversed index values based on the a digits are the lower digits of the offset pointer j while the offset pointer i goes through normal order (0 through N−1). Note that the portion of j produced by and the digit-reversed index values based on the b digits is shifted right by a value nbot, where nbot is the number of digits times digit size (in this case 2) the bottom index produces. Thus by combining the index[a] and the index[b] the appropriate index[i] is produced using a lookup table having a size on the order of square root of N instead of N while the speed of using a full lookup table is still obtained. An exemplary C language program for producing a digit-reversed index of any radix (for bit-reverse radix-2 is used) is shown as Program 3 in Appendix 3 hereinbelow.

This works great for a 16-point in-place digit-reversal since there is an even number of digits but, again, a little more work is necessary to accommodate an odd number of digits such a 64-point array which has 3 digits (in that $64=2^{(2*3)}$). An exemplary tree diagram for a 64-point digit-reverse order sort, similar to that shown in FIG. 7, can be generated. In the tree diagram for the 64-point digit-reverse order sort, not shown, the identical subtrees cross over between levels (i.e., sharing the n3n2 digit pair). This is accommodated by using a variable "astep" to only get the a digits on the outer loop.

In the case of digit-reverse, the variable astep is set to 1 when nbits/radN is even, where the variable radN is the number of bits in a digit (i.e., 1 for bit or radix-2, 2 for 2-digit or radix-4, 3 for 3-digit or radix 8, etc.). The variable astep is set to the radix when nbits/radN is odd. By setting the variable astep to the radix we need only look at the upper half of the tree where n3n2 is zero, the a half, while the lower half of the tree, the b half, takes care of the general cases of n3n2 Again, the exemplary C language program for producing a digit-reversed index of any radix is shown as Program 3 in Appendix 3.

In other embodiments of the present invention, other methods to further reduce cycle counts are implemented. One method reduces the total number of times the bit/digit-reversed lookup table is accessed and another eliminates from the code all together the data loads which it is known will not be swapped.

These methods are implemented by setting up the code so that it only performs lookups with "a" when the least significant bit/digit is zero and lookups with "b" when the most significant bit/digit is zero. With bit-reverse this gives us a starting point of 0X0 and its bit-reverse value 0Y0. In bit-reversed order there are four combinations of when the middle bits are represented by X which are shown in Table 3 below. These are generated by adding offsets of half n (n/2) or 1 to the starting points of 0X0 and 0Y0, thus four pairs of data indices are created by only loading one pair of lookup table values. This reduces the number of loads from the lookup tables by a factor of four.

The second reduction is implemented by removing the loading and storing of the values indexed by 1X0 and 0Y1 since, in these case the index i is always greater than the index j and thus the swap will never be completed. Note that if this was placed in the program conditionally, even though it would never be executed, it would still take up the same amount of cycle time as if it had been executed. Thus, one fourth of the total data loads and stores are removed from the bit-reverse program by removing this segment of code. Exemplary C and assembly language program code for the improved bit-reversing routine are shown as Program 4 and Program 5, respectively, which are given in Appendix 4 and Appendix 5, respectively.

TABLE 3

| i<j cond. | i0 | 0X0 | j0 | 0Y0 |
| i<j always | i1 | 0X1 | j1 | 1Y0 |
| i>j never | | | | |
| i<j cond. | i3 | 1X1 | j3 | 1Y1 |

This technique is extended to digit-reverse by unrolling the code to accept digits. A table for 2-bit digit reverse is shown in Table 4. From this one can see that only one pair of digit-reverse lookup table values are loaded for sixteen potential data loads thereby greatly reducing the cycle counts due to loads. Also from this one can see that i is known to be greater than j six out of the sixteen potential swaps and thus is removed from the code all together.

TABLE 4

| i < j cond.   | i0 | 00X00 | j0 | 00Y00 |
|---------------|----|-------|----|-------|
| i < j always  | i1 | 00X01 | j1 | 01Y00 |
| i < j always  | i2 | 00X10 | j2 | 10Y00 |
| i < j always  | i3 | 00X11 | j3 | 11Y00 |
| i > j never   | i4 | 01X00 | j4 | 00Y01 |
| i < j cond.   | i5 | 01X01 | j5 | 01Y01 |
| i < j always  | i6 | 01X10 | j6 | 10Y01 |
| i < j always  | i7 | 01X11 | j7 | 11Y01 |
| i > j never   | i8 | 10X00 | j8 | 00Y10 |
| i > j never   | i9 | 10X01 | j9 | 01Y10 |
| i < j cond.   | iA | 10X10 | jA | 10Y10 |
| i > j always  | iB | 10X11 | jB | 11Y10 |
| i > j never   | iC | 11X00 | jC | 00Y11 |
| i > j never   | iD | 11X01 | jD | 01Y11 |
| i > j never   | iE | 11X10 | jE | 10Y11 |
| i < j cond.   | iF | 11X11 | jF | 11Y11 |

FIGS. 8A and 8B show basic flow diagram illustrating general operation of the bit and digit reversal methods in accordance with the present invention. As shown in FIG. 8A at block 80, the number of points in the array to be bit (or digit) reversed is first identified. Then, at block 82, bit (or digit) reversal is performed using a common subtree lookup table. In FIG. 8B, which shows in more detailed operation of the bit (or digit) reversal method in accordance with the present invention, sorting tree analysis is performed on the array of N points at block 85. Then, at block 86, a common subtree is identified in accordance with results of the analysis. A lookup table is then created from the common subtree at block 87. Finally, at block 88, bit (or digit) reversal is performed on the N point array using the lookup table created from the common subtree.

Other Embodiments

Although the present invention and its advantages have been described in detail, it should be understood that various changes, substitutions and alterations can be made herein without departing from the spirit and scope of the invention as defined by the appended claims.

What is claimed is:

1. In a data processing system including a central processing unit and memory, a method for performing bit reversal, comprising the steps of:

identifying number of points in an array, stored in said memory, to be bit-reversed; and performing the bit reversal using said central processing unit and using a common subtree lookup table stored in said memory.

2. In a data processing system including a central processing unit and memory, a method for performing digit reversal, comprising the steps of:

identifying number of points in an array, stored in said memory, to be digit-reversed; and performing the digit reversal using said central processing unit and using a common subtree lookup table.

3. In a data processing system including a central processing unit and memory, a method of performing bit reversal on an array of N points, stored in said memory, comprising the steps of:

performing sorting tree analysis on the array using said central processing unit;

identifying a common subtree from said analysis using said central processing unit;

creating a lookup table from said common subtree using said central processing unit; and performing the bit reversal on the array using said lookup table and using said central processing unit.

4. In a data processing system including a central processing unit and memory, a method of performing digit reversal on an array of N points, stored in said memory, comprising the steps of:

performing sorting tree analysis on the array using said central processing unit;

identifying a common subtree from said analysis using said central processing unit;

creating a lookup table from said common subtree using said central processing unit; and performing the digit reversal on the array using said lookup table and using said central processing unit.

* * * * *